(12) United States Patent
Kurihara et al.

(10) Patent No.: US 9,367,349 B2
(45) Date of Patent: Jun. 14, 2016

(54) MULTI-CORE SYSTEM AND SCHEDULING METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Hiromasa Yamauchi, Kawasaki (JP); Takahisa Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 648 days.

(21) Appl. No.: 13/724,920

(22) Filed: Dec. 21, 2012

(65) Prior Publication Data

US 2013/0117754 A1    May 9, 2013

Related U.S. Application Data

(63) Continuation of application No. PCT/JP2010/060912, filed on Jun. 25, 2010.

(51) Int. Cl.
*G06F 9/46* (2006.01)
*G06F 9/48* (2006.01)
*G06F 13/366* (2006.01)

(52) U.S. Cl.
CPC ............... *G06F 9/48* (2013.01); *G06F 9/4881* (2013.01); *G06F 13/366* (2013.01); *G06F 2209/483* (2013.01); *G06F 2209/485* (2013.01)

(58) Field of Classification Search
None
See application file for complete search history.

(56) References Cited

U.S. PATENT DOCUMENTS

| 5,303,369 | A | 4/1994 | Borcherding et al. |
| 2003/0074543 | A1* | 4/2003 | Djafarian ............... G06F 5/01 712/212 |
| 2009/0138890 | A1* | 5/2009 | Blake et al. ............... 718/106 |
| 2009/0254687 | A1* | 10/2009 | Lin et al. .................. 710/107 |
| 2010/0107174 | A1 | 4/2010 | Suzuki et al. |

FOREIGN PATENT DOCUMENTS

| JP | 03-259366 A | 11/1991 |
| JP | 03-282869 A | 12/1991 |
| JP | 04-354044 A | 12/1992 |
| JP | 6-119300 A | 4/1994 |
| JP | 06-214959 A | 8/1994 |
| JP | 10-240698 A | 9/1998 |
| JP | 2004-252670 A | 9/2004 |
| JP | 2008-257594 A | 10/2008 |
| JP | 2010-108153 A | 5/2010 |

OTHER PUBLICATIONS

Office Action, Japanese Patent Application No. 2012-521254 mailing date Jul. 2, 2013.

* cited by examiner

*Primary Examiner* — Mengyao Zhe
(74) *Attorney, Agent, or Firm* — Arent Fox LLP

(57) ABSTRACT

A multi-core system includes multiple processor cores; a bus connected to the processor cores; multiple peripheral devices accessed by the processor cores via the bus; profile information including information concerning access of the peripheral devices by each task assigned to the processor cores; a monitor that based on the profile information, monitors access requests to the peripheral devices from tasks under execution at the processor cores and prohibits an access request that causes contention at the bus; and a scheduler that when the monitor prohibits an access request that causes contention at the bus, switches to a different task.

10 Claims, 7 Drawing Sheets

MULTI-CORE SYSTEM AND SCHEDULING METHOD

CROSS REFERENCE TO RELATED APPLICATIONS

This application is a continuation application of International Application PCT/JP2010/060912, filed on Jun. 25, 2010 and designating the U.S., the entire contents of which are incorporated herein by reference.

FIELD

The embodiments discussed herein are related to a multi-core system and a scheduling method.

BACKGROUND

A multi-core system having a configuration depicted in FIG. 8 has been known. In this multi-core system, a multiple processor cores #0_1 and #1_2 are connected to bus networks 3 and 4, to which multiple buses 5 and 6 are connected. To each of the buses 5 and 6, one or more peripheral devices A7, B8, C9, and D10 are connected. A task #1_11 under execution at the processor core #0_1 and a task #2_12 under execution at the processor core #1_2 may access, during the same period, the peripheral device A7 (or peripheral device B8) and the peripheral device C9 (or peripheral device D10) connected separately to the bus 5 and the bus 6, respectively. In this case, contention at a bus does not occur.

In another case, the task #1_11 and the task #2_12 may access, during the same period, the peripheral device A7 and the peripheral device B8 (or peripheral device C9 and peripheral device D10) connected to the same bus 5 (or bus 6). In this case, contention at the bus occurs and consequently, a bus arbiter arbitrates the contention. As a result of the arbitration, one access is permitted first and following the completion of this access, the other access is permitted.

A load balancing method is known where statistical information indicating a busy state of a bus is attached to a job executed by a processor core and scheduling for alleviating the busy state of the bus is performed based on this statistical information. A bus control method is known that when a bus is being used, a processor executes a different task while waiting to acquire a right to use the bus and when the right to use the bus is released, the processor is caused to execute an interrupt process to use the bus. A system is known that switches processes between different processors during execution of processes to dynamically perform optimal assignment.

For examples of such conventional technologies, refer to Japanese Laid-Open Patent Publication Nos. H10-240698, 114-354044, and H6-214959.

According to the conventional arbitration technique using a bus arbiter, however, permission for the other access is not given until the access permitted first is completed. The processor core waiting for permission for the other access, therefore, suspends (stalls) task execution. As a result, the time required for completing execution of the two tasks causing access contention at the bus increases, which leads to a problem in that the performance of the multi-core system drops.

SUMMARY

According to an aspect of an embodiment, a multi-core system includes multiple processor cores; a bus connected to the processor cores; multiple peripheral devices accessed by the processor cores via the bus; profile information including information concerning access of the peripheral devices by each task assigned to the processor cores; a monitor that based on the profile information, monitors access requests to the peripheral devices from tasks under execution at the processor cores and prohibits an access request that causes contention at the bus; and a scheduler that when the monitor prohibits an access request that causes contention at the bus, switches to a different task.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a multi-core system and a scheduling method according to the present invention will be described in detail with reference to the accompanying drawings. The following embodiments relate to the multi-core system in which access requests to peripheral devices are monitored based on access information concerning access of the peripheral devices; an access request that causes contention at the bus is prohibited; and a task that causes contention at the bus is replaced with a different task. In a process executed by a processor core, a block of sub-processes of meaning (unit of processing) is referred to as a task. A task includes, therefore, a thread, process, etc. in terms of concept. The embodiments do not limit the present invention.

Figure 1:
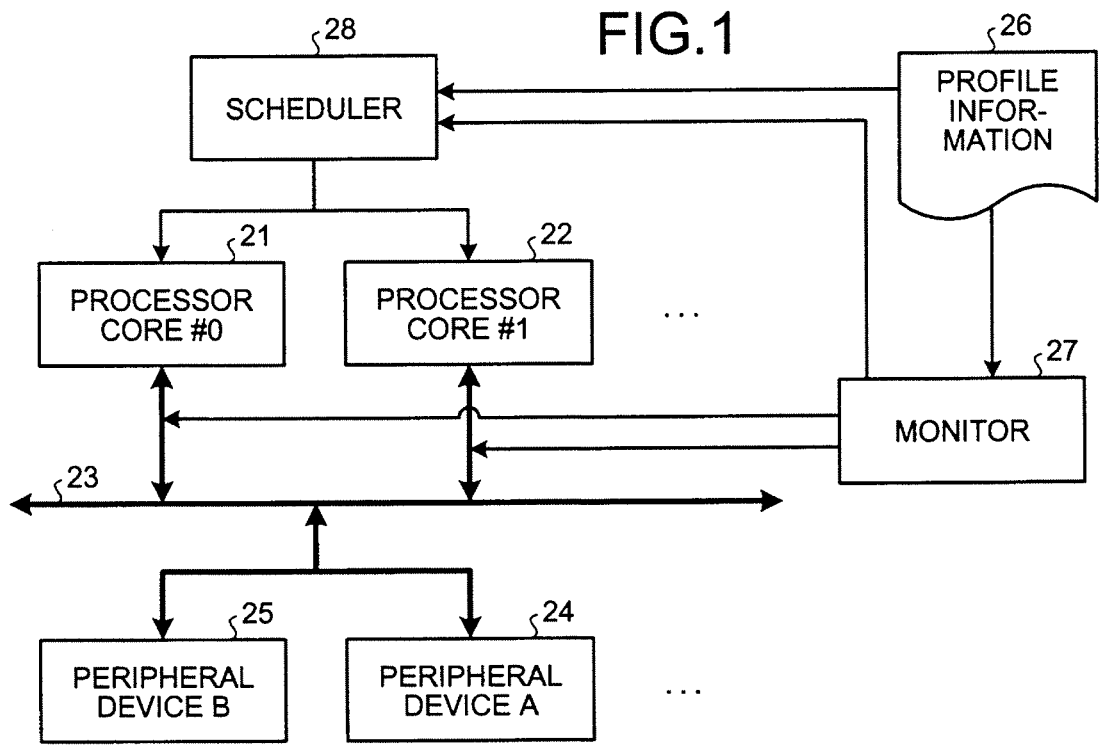
FIG. 1 is a block diagram of a multi-core system according to a first embodiment.

FIG. 1 is a block diagram of a multi-core system according to a first embodiment. As depicted in FIG. 1, the multi-core system includes multiple processor cores #0_21 and #1_22, a bus 23, multiple peripheral devices A24 and B25, profile information 26, a monitor 27, and a scheduler 28. The bus 23 is connected to each of the processor cores #0_21 and #1_22. Each of the peripheral devices A24 and B25 can be accessed by each of the processor cores #0_21 and #1_22 via the bus 23.

The profile information 26 includes information concerning access of the peripheral devices A24 and B25 by each task assigned to the processor cores #0_21 and #1_22. The monitor 27 monitors access requests to each of the peripheral devices A24 and B25 made by a task under execution at each of the processor cores #0_21 and #1_22, based on the profile information. The monitor 27 prohibits an access request that causes contention at the bus. When the monitor 27 prohibits an access request that causes contention at the bus, the scheduler 28 replaces the task that causes contention at the bus with a different task.

Figure 2:
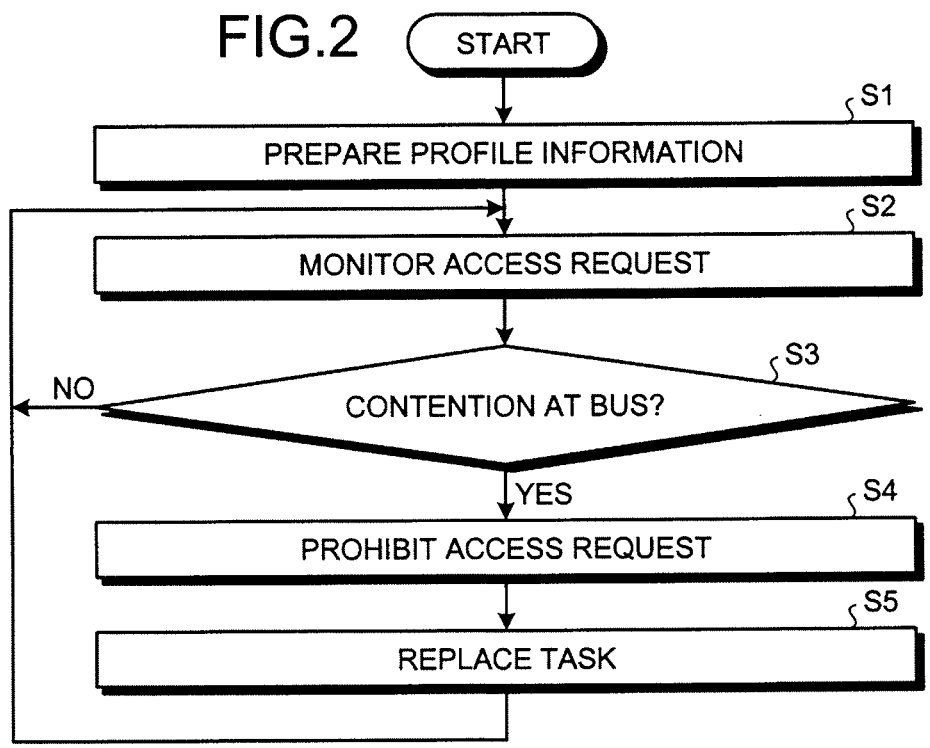
FIG. 2 is a flowchart of a scheduling method according to the first embodiment.

FIG. 2 is a flowchart of a scheduling method according to the first embodiment. As depicted in FIG. 2, in preparation for performing task scheduling, the above profile information 26 is provided in advance (step S1). Subsequently, the monitor 27 monitors access requests to each of the peripheral devices A24 and B25 made by a task under execution at each of the processor cores #0_21 and #1_22 (step S2), based on the profile information 26. When an access request from a task under execution at one of the processor cores #0_21 and #1_22 causes contention at the bus (step S3: YES), the monitor 27 prohibits the access request that causes contention at the bus (step S4).

Subsequently, the scheduler 28 replaces the task, which causes contention at the bus and for which access is prohibited, with a different task (step S5). The process flow returns to the step of access request monitoring by the monitor 27 (step S2), from which step S2 to step S5 are repeated. If contention at the bus is not caused (step S3: NO), the monitor 27 continues to monitor access requests to each of the peripheral devices A24 and B25 (step S2). If contention at the bus is not caused (step S3: NO) or if the task causing contention at the bus is replaced with a task that does not cause contention (step S5), contention at the bus, of course, does not occur. Access request monitoring by the monitor 27, therefore, may be ended.

According to the first embodiment, a task having issued an access request that causes contention at the bus is replaced with a different task, thereby enabling the processor core executing the task having issued the access request to execute a different task during a period when a task under execution at a different processor core uses the bus. The processor core executing the task having issued the access request that causes contention at the bus, therefore, has no need to keep suspending (stalling) task execution until the bus is released. Hence, a drop in the performance of the multi-core system can be prevented.

Figure 3:
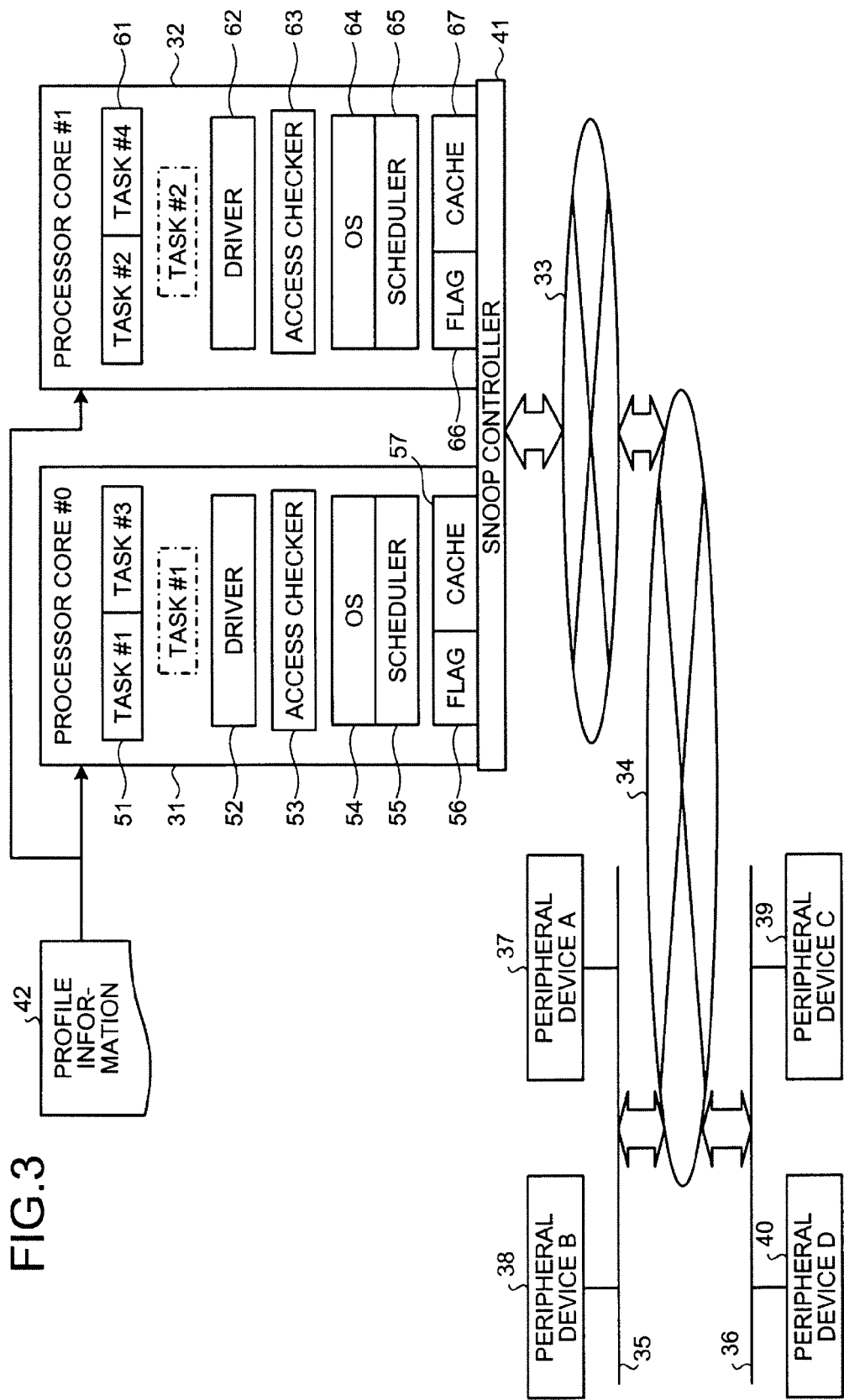
FIG. 3 is a block diagram of the multi-core system according to a second embodiment.

FIG. 3 is a block diagram of the multi-core system according to a second embodiment. As depicted in FIG. 3, the multi-core system includes multiple processor cores #0_31 and #1_32. Each of the processor cores #0_31 and #1_32 can access multiple peripheral devices A37, B38, C39, and D40 via bus networks 33 and 34 and buses 35 and 36. When an access request is issued, during the same period, to the peripheral device A37 and peripheral device B38 (or peripheral device C39 and peripheral device D40) connected to the same bus 35 (or bus 36), contention occurs at the bus. If an access request is issued, during the same period, to the peripheral device A37 (or peripheral device B38) and the peripheral device C39 (or peripheral device D40) connected separately to the bus 35 and the bus 36, respectively, contention does not occur at the bus.

The processor cores #0_31 and #1_32 are provided with task execution queues 51 and 61, respectively. The task execution queues 51 and 61 store therein unprocessed tasks waiting for execution by the processor cores #0_31 and #1_32. For example, as depicted in FIG. 3, a task #1 and a task #3 are stored as execution waiting tasks in the execution queue 51 of the processor core #0_31, while a task #2 and a task #4 are stored in the execution queue 61 of the processor core #1_32.

Each task is assigned to each of the processor cores #0_31 and #1_32 by a scheduler 55 of an operating system (OS) 54 running on the processor core #0_31 serving as a master processor core. A task assigned to each of the processor cores #0_31 and #1_32 is scheduled by schedulers 55 and 65 of operating systems (OS) 54 and 64 running on the processor cores #0_31 and #1_32, respectively.

The scheduler 55 of the processor core #0_31 serving as the master processor core works in cooperation with the scheduler 65 of the other processor core #1_32 (slave core to the master core), thereby enabling the schedulers 55 and 65 of the processor cores #0_31 and #1_32 to know the tasks assigned to each of the processor cores #0_31 and #1_32. The schedulers 55 and 65 are implemented when the operating systems (OS) 54 and 64 operate on the processor cores #0_31 and #1_32, respectively.

The operation of the operating systems (OS) 54 and 64 on the processor cores #0_31 and #1_32 also implements access checkers 53 and 63 serving as monitors at the processor cores #0_31 and #1_32, respectively. The access checker 53 of the processor core #0_31 monitors access requests issued by a task under execution at the processor core #0_31, to the peripheral devices A37, B38, C39, and D40. The access checker 63 of the processor core #1_32 monitors access requests issued by a task under execution at the processor core #1_32, to the peripheral devices A37, B38, C39, and D40. The access checkers 53 and 63 monitor access requests when a task that causes contention at the bus by accessing the peripheral devices A37, B38, C39, and D40 is present among a group of tasks executed at the processor cores #0_31 and #1_32. The access checkers 53 and 63 prohibit an access request to the peripheral devices A37, B38, C39, and D40 and causing contention at the bus.

On the operating systems (OS) 54 and 64, drivers 52 and 62 operate, which correspond to the peripheral devices A37, B38, C39, and D40 accessed by a task under execution. In FIG. 3, the tasks #1 and #2 are indicated by single-dot chain lines, as an example of tasks under execution.

The processor cores #0_31 and #1_32 are provided with flags 56 and 66, respectively. The flag 56 of the processor core #0_31 is set on, for example, part of a cache 57 in the processor core #0_31. The flag 66 of the processor core #1_32 is set on, for example, part of a cache 67 in the processor core #1_32. The values of the flags 56 and 66 are controlled by the access checkers 53 and 63. The values of the flags 56 and 66 are set to, for example, 1 when a task that causes contention at the bus issues a request for access of the peripheral devices A37, B38, C39, and D40 and causes contention at the bus. The values of the flags 56 and 66 are set to, for example, 0 when a task that does not cause contention at the bus issues a request for access of the peripheral devices A37, B38, C39, and D40.

Coherency between the value of the flag 56 of the processor core #0_31 and the value of the flag 66 of the processor core #1_32 is maintained by, for example, a snoop controller 41 serving as a controller provided as hardware. By using the snoop controller 41, the value of the flag 56 and the value of the flag 66 can be kept identical to each other between the processor core #0_31 and the processor core #1_32 without using a bus in the processor cores #0_31 and #1_32. Inter-processor communication may be used instead of using the snoop controller 41.

Each of the processor cores #0_31 and #1_32 acquires profile information 42. The profile information 42 includes information indicating the peripheral devices A37, B38, C39, and D40 that a task assigned to the processor cores #0_31 and #1_32 accesses. The profile information 42 is, for example, acquired in advance by a profiler or simulator at the design stage of an application program. The profile information 42 is, for example, described in the application program, and is stored in an internal memory (not depicted) of each of the processor cores #0_31 and #1_32 when the application program is executed at each of the processor cores #0_31 and #1_32. The schedulers 55 and 65 of the processor cores #0_31 and #1_32 perform task scheduling based on the profile information 42.

An operation procedure by the scheduler and an operation procedure by the access checker will be described to provide an explanation of a scheduling method according to the second embodiment.

The operation procedure by the scheduler will first be described. The operation procedure by the scheduler 55 of the processor core #0_31 serving as the master core is the same as the operation procedure by the scheduler 65 of the processor core #1_32 serving as a slave core, except for a task assigning process. The operation procedure by the scheduler 55 of the processor core #0_31 serving as the master core will be described.

Figure 4:
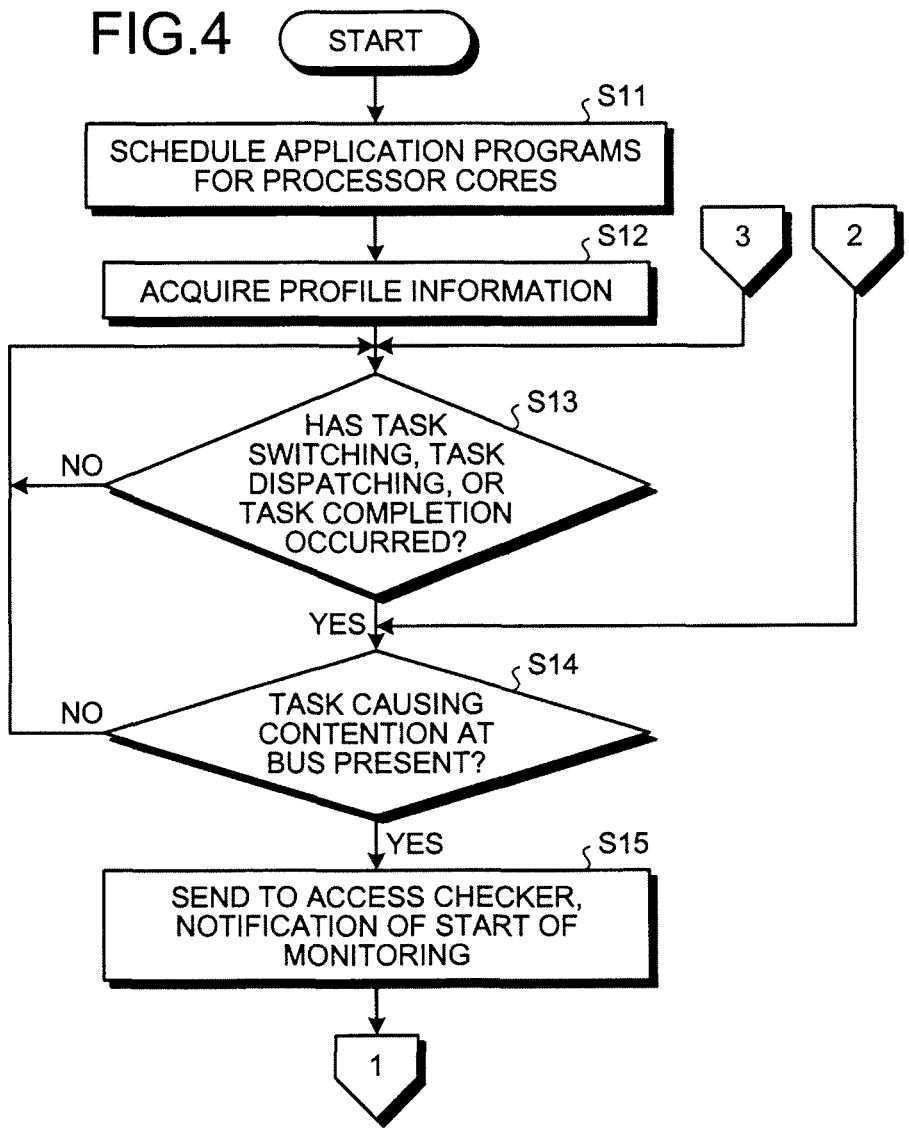
FIG. 4 is a flowchart of an operation procedure by a scheduler, according to the scheduling method of the second embodiment.
Figure 5:
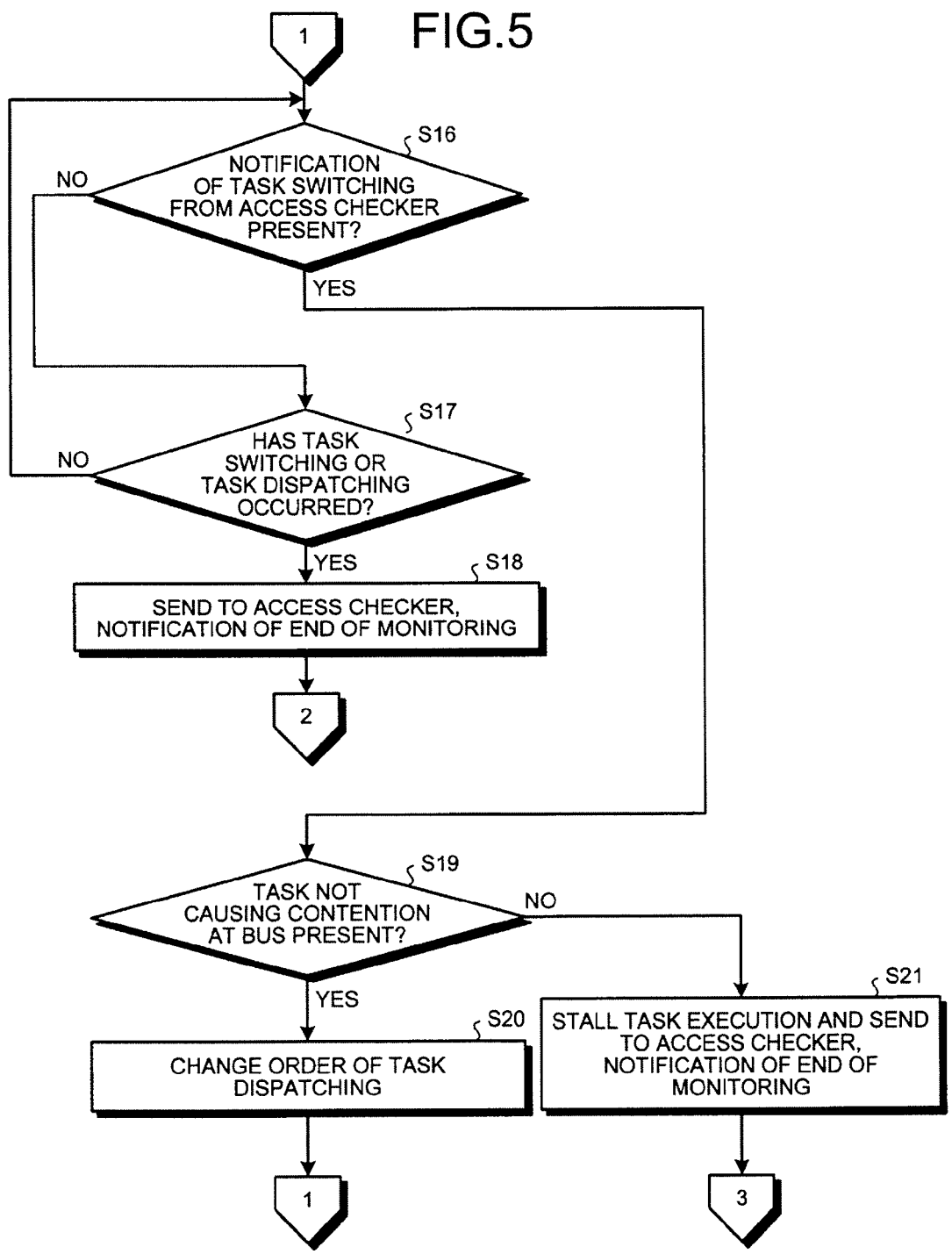
FIG. 5 is a flowchart of steps following the steps depicted in FIG. 4.

FIG. 4 is a flowchart of the operation procedure by the scheduler, according to the scheduling method of the second embodiment. FIG. 5 is a flowchart of steps following the steps depicted in FIG. 4. As depicted in FIG. 4, when the scheduler 55 starts processing, the scheduler 55 schedules application programs to be executed by each of the processor cores #0_31 and #1_32 and assigns the scheduled application programs to each of the processor cores #0_31 and #1_32 (step S11). The scheduler 55 acquires the profile information 42 (step S12).

The scheduler 55 determines if task switching, task dispatching, or task completion has occurred at one of the processor cores #0_31 and #1_32 (step S13). If task switching, task dispatching, or task completion has not occurred (step S13: NO), the scheduler 55 waits for the occurrence of task switching, task dispatching, or task completion. If task switching, task dispatching, or task completion has occurred (step S13: YES), the scheduler 55 determines whether a task that causes contention at the bus by accessing the peripheral devices A37, B38, C39, and D40 is present among a group of tasks about to be executed at the processor cores #0_31 and #1_32 (step S14).

If a task that causes contention at the bus is not present (step S14: NO), the scheduler 55 returns to step S13 and waits until task switching, task dispatching, or task completion newly occurs at one of the processor cores #0_31 and #1_32. While the scheduler 55 waits, the processor core #0_31 executes a task dispatched thereto. If a task that causes contention at the bus is present (step S14: YES), the scheduler 55 sends to the access checker 53 of the processor cores #0_31, notification of the start of monitoring of access requests to the peripheral devices A37, B38, C39, and D40 (step S15). Receiving this notification, the access checker 53 starts monitoring access requests to the peripheral devices A37, B38, C39, and D40. The contents of processing by the access checker 53 will be described hereinafter.

Subsequently, as depicted in FIG. 5, the scheduler 55 determines whether a notification of task switching from the access checker 53 is present (step S16). If a task that causes contention at the bus is under execution at the processor core #0_31 and issues an access request to the peripheral devices A37, B38, C39, and D40, a task that causes contention at the bus and is under execution at the processor core #1_32 may have already accessed the peripheral devices A37, B38, C39, and D40. In such a case, the access checker 53 of the processor core #0_31 issues notification of task switching. If notification of task switching is present (step S16: YES), therefore, the scheduler 55 determines whether a task that does not cause contention at the bus is present in the execution queue 51 of the processor core #0_31 (step S19).

Generally, dozens of tasks are present while the operating system 54 is running and consequently, multiple tasks are queued in the execution queue 51. If a task that does not cause contention at the bus is present (step S19: YES), the scheduler 55 changes the order of task dispatching so that the task that does not cause contention at the bus is executed sooner than the task that causes contention at the bus (step S20). The scheduler 55 sends to the access checker 53, notification of the change in the order of task dispatching. The scheduler 55 returns to step S16, at which notification of task switching from the access checker 53 is not present (step S16: NO). The scheduler 55 thus determines if task switching or task dispatching has occurred (step S17).

Dispatch of the task that does not cause contention at the bus occurs as a result of the change in the order of task dispatching at step S20 (step S17: YES). The scheduler 55, therefore, sends to the access checker 53, notification of the end of monitoring of access requests to the peripheral devices A37, B38, C39, and D40 (step S18). Receiving this notification, the access checker 53 ends the monitoring of access requests to the peripheral devices A37, B38, C39, and D40. The scheduler returns to step S14, at which a task that causes contention at the bus is not present among a group of tasks about to be executed (step S14: NO). The scheduler returns to step S13, and waits until task switching, task dispatching, or task completion newly occurs at one of the processor cores #0_31 and #1_32. While the scheduler 55 waits, the processor core #0_31 executes the task that does not cause contention at the bus and that is given an earlier dispatch at step S20.

If notification of task switching from the access checker 53 is present (step S16: YES) but a task that does not cause contention at the bus is not present in the execution queue 51 (step S19: NO), the scheduler 55 suspends (stalls) task execution in progress and sends to the access checker 53, notification of the end of monitoring of access requests (step S21). The scheduler returns to step S13, and waits until task switching, task dispatching, or task completion newly occurs at one of the processor cores #0_31 and #1_32.

If notification of task switching from the access checker 53 is not present (step S16: NO) and neither task switching nor task dispatching has occurred (step S17: NO), the scheduler 55 waits for notification of task switching from the access checker 53 or the occurrence of task switching or task dispatching. The above processes at step S13 to step S21 are repeated until tasks to be executed have been exhausted. The scheduler 65 of the processor core #1_32 serving as a slave core executes a series of steps of the operation procedure depicted in FIGS. 4 and 5, from which, however, step S11 is omitted for the case of the scheduler 65.

The operation procedure by the access checker will be described. The operation procedure by the access checker 53 of the processor core #0_31 serving as the master core is identical to the operation procedure by the access checker 63 of the processor core #1_32 serving as a slave core. The operation procedure by the access checker 53 of the processor core #0_31 serving as the master core will be described.

Figure 6:
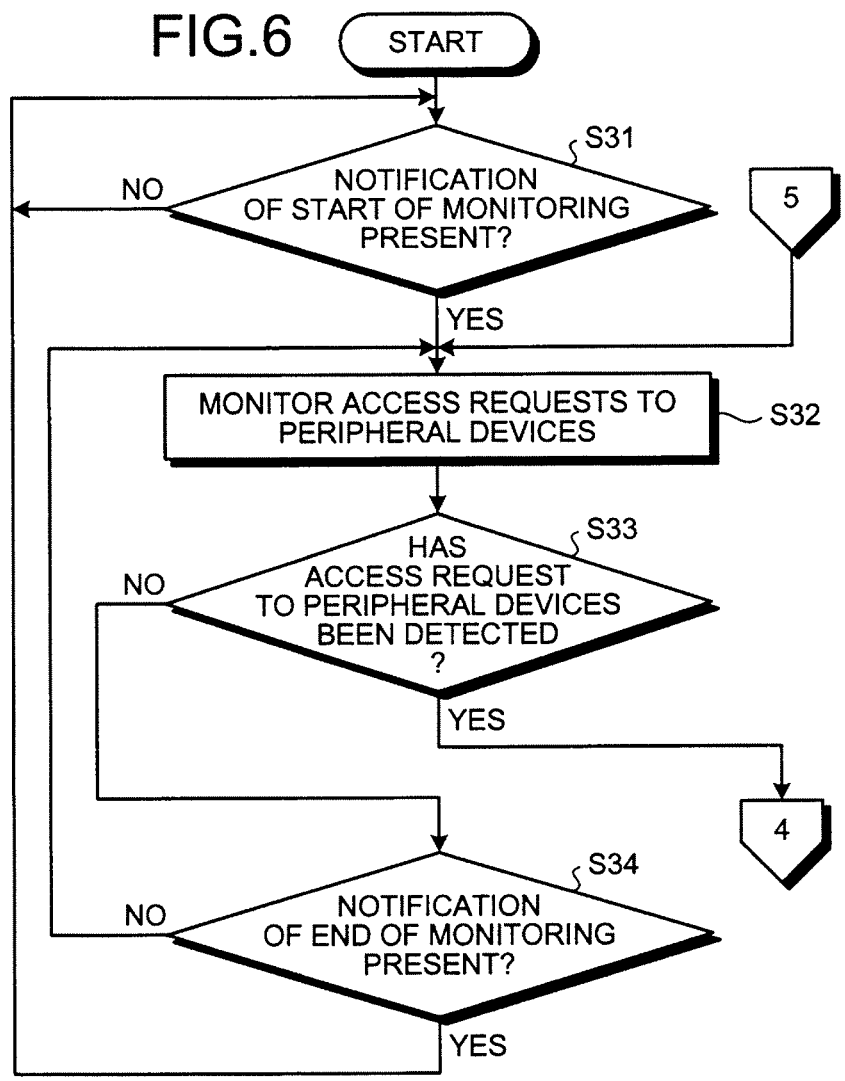
FIG. 6 is a flowchart of an operation procedure by an access checker, according to the scheduling method of the second embodiment.
Figure 7:
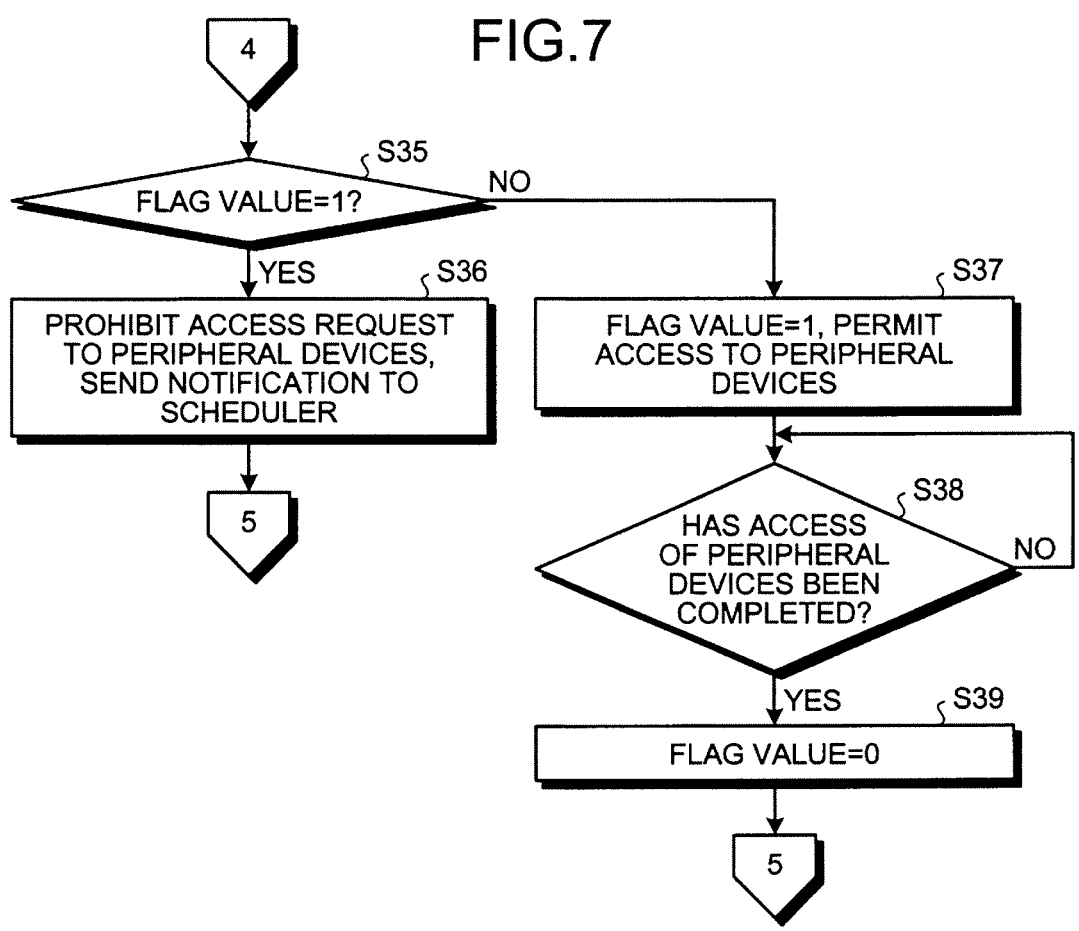
FIG. 7 is a flowchart of steps following the steps depicted in FIG. 6.
Figure 8:
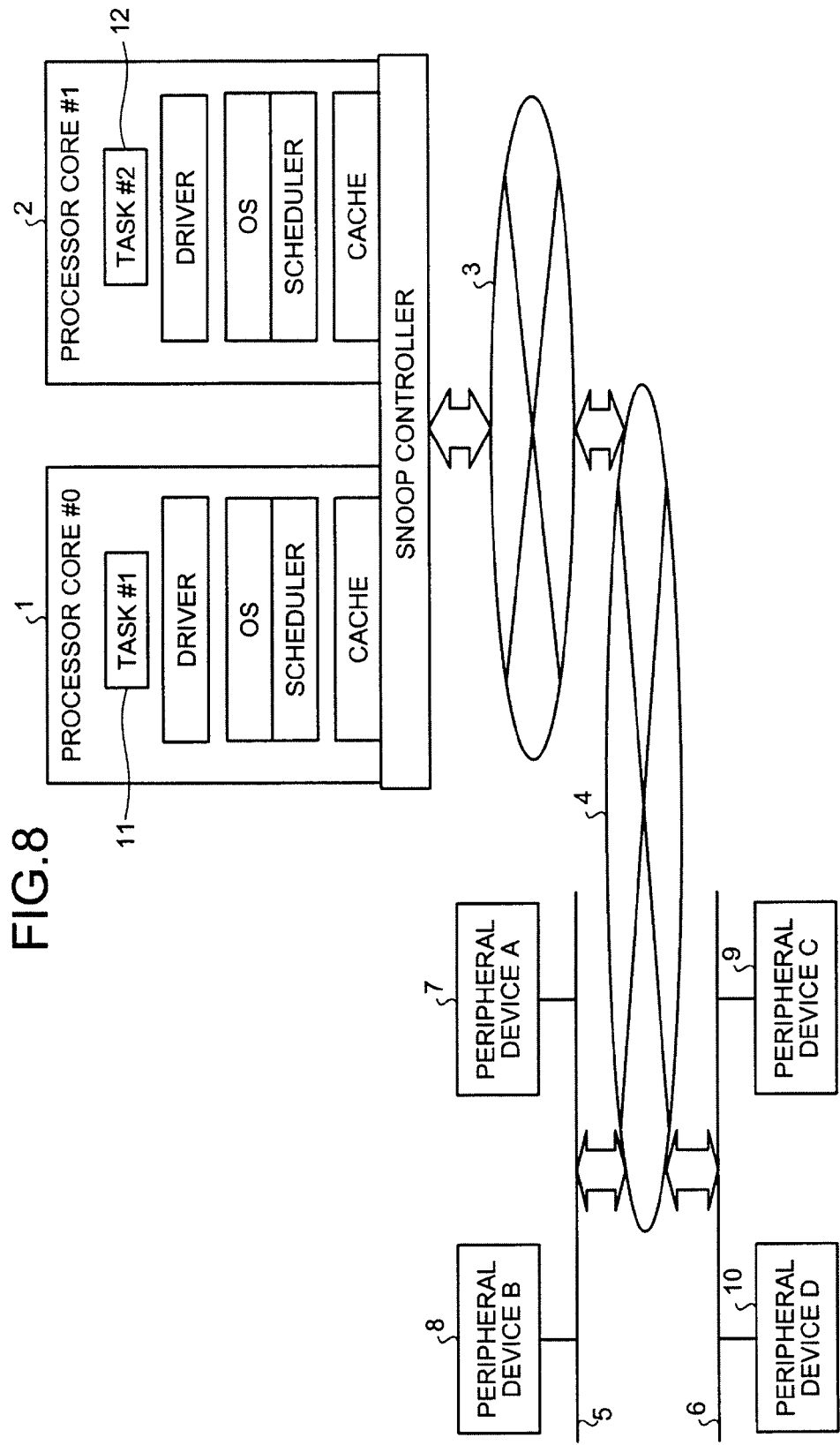
FIG. 8 is a block diagram of a conventional multi-core system.

FIG. 6 is a flowchart of an operation procedure by the access checker, according to the scheduling method of the second embodiment. FIG. 7 is a flowchart of steps following the steps depicted in FIG. 6. As depicted in FIG. 6, when the access checker 53 starts processing, the access checker 53 determines whether notification from the scheduler 55 of the processor core #0_31 has arrived, the notification being of the start of monitoring of access requests to the peripheral devices A37, B38, C39, and D40 and issued by a group of tasks executed at the processor cores #0_31 and #1_32 (step S31). This notification of the start of monitoring is the notification issued at step S15 in the above procedure by the scheduler.

If notification of the start of monitoring has not arrived yet (step S31: NO), the access checker 53 waits for the arrival of the notification. If notification of the start of monitoring has arrived (step S31: YES), the access checker 53 monitors the issue of access requests to the peripheral devices A37, B38, C39, and D40 by a task under execution at the processor core #0_31 (step S32). The access checker 53 determines whether an access request to the peripheral devices A37, B38, C39, and D40, issued from a task under execution at the processor core #0_31 has been detected (step S33).

Upon detecting an access request to the peripheral devices A37, B38, C39, and D40 (step S33: YES), the access checker 53 determines whether the value of the flag 56 of the processor core #0_31 is 1, as depicted in FIG. 7 (step S35). If the value of the flag 56 is 0 (step S35: NO), the access checker 53 changes the value of the flag 56 to 1, and concurrently, the value of the flag 66 of the processor core #1_32 is also changed to 1 by, for example, the snoop controller 41. The access checker 53 permits the task under execution by the processor core #0_31 to access the peripheral devices A37, B38, C39, and D40 (step S37).

Subsequently, the access checker 53 determines whether the permitted access of the peripheral devices A37, B38, C39, and D40 has been completed (step S38). If the access of the peripheral devices A37, B38, C39, and D40 has not been completed (step S38: NO), the access checker 53 waits for the completion of the access. If the access of the peripheral devices A37, B38, C39, and D40 has been completed (step S38: YES), the access checker 53 changes the value of the flag 56 of the processor core #0_31 to 0 (step S39), and concurrently, the value of the flag 66 of the processor core #1_32 is also changed to 0 by, for example, the snoop controller 41. The access checker 53 returns to step S32 and monitors issue of access requests to the peripheral devices A37, B38, C39, and D40 by a task under execution at the processor core #0_31.

If a task under execution at the processor core #0_31 issues an access request to the peripheral devices A37, B38, C39, and D40 (step S33: YES), a task under execution at the processor core #1_32 may have already accessed the peripheral devices A37, B38, C39, and D40, which causes contention at the bus. In this case, the value of the flag 66 of the processor core #1_32 has already been changed from 0 to 1, and this value change is reflected on the value of the flag 56 of the processor core #0_31 by, for example, the snoop controller 41, and as a result, the value of flag 56 is set to 1 (step S35: YES).

In this case, the access checker 53 prohibits the access request to the peripheral devices A37, B38, C39, and D40 from the task under execution at the processor core #0_31, and sends notification of task switching to the scheduler 55 of the processor core #0_31 (step S36). In the above operation procedure by the scheduler, the scheduler 55 determines at step S16 whether this notification of switching is present. Subsequently, the access checker 53 returns to step S32, and monitors issue of access requests to the peripheral devices A37, B38, C39, and D40 by a task under execution at the processor core #0_31.

When monitoring access requests to the peripheral devices A37, B38, C39, and D40, the access checker 53 may receive notification issued by the scheduler 55 at step S20 in the above operation procedure by the scheduler. This notification indicates that the order of task dispatching has been changed and a task that does not cause contention at the bus is dispatched. When the access checker 53 receives this notification, therefore, a task that does not cause contention at the bus is executed at the processor core #0_31. As a result, during execution of this task, an access request to the peripheral devices A37, B38, C39, and D40, causing contention at the bus does not arise.

Even if a task that does not cause contention at the bus issues an access request to the peripheral devices A37, B38, C39, and D40 in an exceptional case, the access checker 53 does not detect this access request (step S33: NO). The access checker 53 determines whether notification of the end of monitoring of access requests to the peripheral devices A37, B38, C39, and D40 has arrived from the scheduler 55 (step S34). This notification of the end of monitoring is the notification issued at step S18 of the above operation procedure by the scheduler.

If notification of the end of monitoring has not arrived (step S34: NO), the access checker 53 returns to step S32 and continues monitoring of the access requests to the peripheral devices A37, B38, C39, and D40. If notification of the end of monitoring has arrived (step S34: YES), the access checker 53 returns to step S31 and waits for the arrival of notification of the start of monitoring of access requests to the peripheral devices A37, B38, C39, and D40. The above processes at step S31 to step S39 are repeated until the tasks to be executed have been exhausted.

The presence/absence of notification of the start of monitoring of access requests to the peripheral devices A37, B38, C39, and D40 may be determined based on the value of a dedicated flag set for the determination. In this case, it is unnecessary to maintain the coherency of flags for determining the presence/absence of the notification between the processor core #0_31 and the processor core #1_32. Maintaining the coherency of flags is also unnecessary in a case of flags for determining the presence/absence of notification of the end of monitoring of access requests to the peripheral devices A37, B38, C39, and D40, in a case of flags for determining the presence/absence of notification of change of order of task dispatching, and in a case of the presence/absence of notification of task switching.

With regard to the multi-core system of the second embodiment, the following cases (1) to (3) are considered. These three cases will be described with reference to the above flowcharts.

(1) A case where a group of tasks executed at the processor core #0_31 and the processor core #1_32 do not cause contention at the bus (2) A case where a group of tasks executed at the processor core #0_31 and the processor core #1_32 cause contention at the bus and a task that does not cause contention at the bus is present in the execution queue 51 of the processor core #0_31 (or in the execution queue 61 of the processor core #1_32)

(3) A case where a group of tasks executed at the processor core #0_31 and the processor core #1_32 cause contention at the bus and a task that does not cause contention at the bus is not present in the execution queue 51 of the processor core #0_31 (nor in the execution queue 61 of the processor core #1_32)

Case (1) A task that causes contention at the bus by accessing the peripheral devices A37, B38, C39, and D40 is not present among a group of tasks about to be executed at the processor cores #0_31 and #1_32 (step S14: NO). Each of the processor cores #0_31 and #1_32, therefore, executes the tasks one after another until a task that causes contention at the bus by accessing the peripheral devices A37, B38, C39, and D40 is found among the group of tasks to be executed. In this case, the access checkers 53 and 63 of the processor cores #0_31 and #1_32 do not monitor access requests to the peripheral devices A37, B38, C39, and D40. The values of the flags 56 and 66 of the processor cores #0_31 and #1_32 are 0.

Case (2) A task that causes contention at the bus by accessing the peripheral devices A37, B38, C39, and D40 is present among a group of tasks about to be executed at the processor cores #0_31 and #1_32 (step S14: YES). The access checkers 53 and 63 of the processor cores #0_31 and #1_32, therefore, monitor access requests to the peripheral devices A37, B38, C39, and D40 (step S15, step S31: YES, step S32). In this state, for example, it is assumed that the access checker 63 of the processor cores #1_32 detects a task under execution at the processor cores #1_32 and having issued an access request to the peripheral devices A37, B38, C39, and D40 (step S33: YES). In this case, since the value of the flag 66 of the processor core #1_32 is 0 (step S35: NO), the value of the flag 66 is changed from 0 to 1. At the same time, the value of the flag 56 of the processor core #0_31 is also changed to 1 by, for example, the snoop controller 41.

The task under execution at the processor core #1_32 is permitted to access the peripheral devices A37, B38, C39, and D40 (step S37). The task under execution at the processor core #1_32, thus, accesses the peripheral devices A37, B38, C39, and D40. When the task under execution at the processor core #1_32 completes the access of the peripheral devices A37, B38, C39, and D40 (step S38: YES), the value of the flag 66 of the processor core #1_32 is set back to 0 (step S39). At the same time, the value of the flag 56 of the processor core #0_31 is also set back to 0 by, for example, the snoop controller 41.

During a period when the task under execution at the processor core #1_32 accesses the peripheral devices A37, B38, C39, and D40, the value of the flag 56 of the processor core #0_31 remains 1. At this time, if a task under execution at the processor core #0_31 issues an access request to the peripheral devices A37, B38, C39, and D40, causing contention at the bus, the access request is detected by the access checker 53 of the processor core #0_31 (step S33: YES). Since the value of the flag 56 of the processor core #0_31 is 1 (step S35: YES), the access request by the task under execution at the processor core #0_31 for access of the peripheral devices A37, B38, C39, and D40 is prohibited (step S36). The scheduler 55 of the processor core #0_31 changes the order of task dispatching so that a task that does not cause contention at the bus is executed first (step S36, step S16: YES, step S19: YES, step S20).

Because the task executed at the processor core #0_31 is replaced with a task that does not cause contention at the bus (step S17: YES), the access checkers 53 and 63 of the processor cores #0_31 and #1_32 ends monitoring of access requests to the peripheral devices A37, B38, C39, and D40 (step S18, step S34: YES). The same scheduling process as described above is executed in a case where a task under execution at the processor cores #0_31 is permitted to make access and the order of task dispatching is changed at the processor core #1_32.

Case (3) The case (3) is the same as the case (2) up to the point at which an access request from a task under execution at the processor cores #0_31 to the peripheral devices A37, B38, C39, and D40 is prohibited. When this access request is prohibited (step S36), and a task that does not cause contention at the bus is not present in the execution queue 51 of the processor cores #0_31 (step S16: YES, step S19: NO), execution of the task under execution at the processor cores #0_31 is suspended (stalled) (step S21). When access of the peripheral devices A37, B38, C39, and D40 by a task under execution at the processor cores #1_32 has been completed (step S38: YES), the values of the flags 56 and 66 of the processor cores #0_31 and #1_32 are set back to 0 (step S39).

The second embodiment offers the same effect as the first embodiment. For example, when the number of times of dispatching per second is N (times/s), an operation time of a task at each dispatching is 1/N (s). If M tasks operate simultaneously, the number of times of dispatching each task per second is N/M (times/s). Hence, the total operation time of the tasks per second is (N/M)×1/N, that is, 1/M (s). Therefore, in contrast to a conventional case where task execution is suspended (stalled), a process time of 1/M (s) can be used effectively when contention at the bus occurs once. For example, because dozens of tasks operate simultaneously in an integrated system, applying the second embodiment to such a system achieves a sufficient effect.

While a multi-core processor as a single microprocessor having multiple built-in processor cores is described as an example of the multi-core system in the first and second embodiments, the embodiments are also applicable to a multi-processor equipped with multiple microprocessors. When the embodiments are applied to the multi-processor, each processor core described above is equivalent to each processor. The multi-core system and scheduling method according to the first embodiment or second embodiment are applicable to, for example, a device having a multi-core-based integration system, such as cellular phone.

The multi-core system and the scheduling method can prevent drops in the performance of the multi-core system.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core system comprising:
  a plurality of processor cores;
  a bus configured to connect a plurality of peripheral devices to the plurality of processor cores; and
  a storage unit configured to store profile information indicating the peripheral devices which a task assigned to the plurality of processor cores access, wherein one of the plurality of processor cores is configured to switch tasks under execution at the processor cores to a different task that does not access the bus for execution based on the profile information, when access requests to the peripheral devices from the tasks under execution at the processor cores are determined to cause contention at the bus.

2. The multi-core system according to claim 1, wherein the different task is a task that does not cause contention at the bus based on the profile information.

3. The multi-core system according to claim 2, wherein a scheduler is configured to, based on the profile information, cause a monitor to start monitoring access requests when scheduling a task that causes contention at a bus and causes the monitor to end monitoring of access requests when switching the task that causes contention at the bus with the different task that does not cause contention at the bus.

4. The multi-core system according to claim 2, comprising a flag indicating a utilization state of the bus, wherein a monitor is configured to, when permitting access of the peripheral device for an access request under monitoring, set the flag to indicate use of the bus.

5. The multi-core system according to claim 2, comprising a flag indicating a utilization state of the bus, wherein a monitor is configured to prohibit an access request that causes contention at the bus when the flag indicates use of the bus.

6. The multi-core system according to claim 4, wherein each of the processor cores includes the flag, and the multi-core system comprises a controller that establishes coherency among the flags of the processor cores.

7. The multi-core system according to claim 5, wherein each of the processor cores includes the flag, and the multi-core system comprises a controller that establishes coherency among the flags of the processor cores.

8. A scheduling method for a multi-core system comprising a plurality of processor cores, a bus configured to connect a plurality of peripheral devices to the processor cores, and a storage unit, the scheduling method comprising:

writing, by one of the processor cores in the storage unit, profile information indicating the peripheral devices which a task assigned to the plurality of processor cores accesses;

switching, by one of plurality of processor cores, to a different task that does not access the bus based on the profile information, when access requests to the peripheral devices from tasks under execution at the plurality of processor cores are determined to cause contention at the bus.

9. The scheduling method according to claim 8, wherein the different task is a task that does not cause contention at the bus based on the profile information.

10. The scheduling method according to claim 9, further comprising:

monitoring access requests when scheduling a task that causes contention at a bus, based on the profile information, and terminating the monitoring of the access requests when the task that causes contention at the bus is replaced with the different task that does not cause contention at the bus.

* * * * *